(12) United States Patent
Guo et al.

(10) Patent No.: US 11,321,120 B2
(45) Date of Patent: May 3, 2022

(54) DATA BACKUP METHOD, ELECTRONIC DEVICE AND COMPUTER PROGRAM PRODUCT

(71) Applicant: EMC IP Holding Company LLC, Hopkinton, MA (US)

(72) Inventors: Yongsheng Guo, Shanghai (CN); Mike Xiaoliang Zhu, Shanghai (CN); Jing Yu, Shanghai (CN); Crystal Jingjing Guo, Shanghai (CN); Roger Zhihong Zeng, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 50 days.

(21) Appl. No.: 15/931,207

(22) Filed: May 13, 2020

(65) Prior Publication Data
US 2021/0303339 A1 Sep. 30, 2021

(30) Foreign Application Priority Data
Mar. 27, 2020 (CN) .......................... 202010229730.4

(51) Int. Cl.
*G06F 9/48* (2006.01)
*G06F 16/27* (2019.01)
*G06F 9/445* (2018.01)
*G06F 9/50* (2006.01)

(52) U.S. Cl.
CPC ........ *G06F 9/4881* (2013.01); *G06F 9/44505* (2013.01); *G06F 9/5038* (2013.01); *G06F 16/27* (2019.01)

(58) Field of Classification Search
CPC .................................................... G06F 9/4881
See application file for complete search history.

(56) References Cited

U.S. PATENT DOCUMENTS

| 9,430,290 B1* | 8/2016 | Gupta ....................... G06F 9/52 |
| 2015/0143381 A1* | 5/2015 | Chin ....................... G06F 9/485 |
| | | 718/104 |

\* cited by examiner

*Primary Examiner* — Charlie Sun
(74) *Attorney, Agent, or Firm* — Womble Bond Dickinson (US) LLP

(57) ABSTRACT

Embodiments of the present disclosure provide a data backup method, an electronic device and a computer program product. The method provided includes creating a workflow related to a data source, the workflow being configured to generate a copy of the data source or to replicate the copy of the data source to a remote device. The method further includes identifying a dependency of the workflow, the dependency indicating whether the workflow depends on at least one additional workflow related to the data source. The method further includes scheduling the workflow based at least on the identified dependency. According to the embodiments of the present disclosure, by use of a dependency-based scheduling mechanism, the performance of a storage system can be improved, and consumption of resources such as a storage and an internal memory can be reduced.

20 Claims, 9 Drawing Sheets

```
"stages": [
    {
        "createdAt": "2019-10-30T10:15:47.639Z",
        "operations": [
            {
                "schedule": {
                    "duration": "PT23H59M",
                    "startTime": "2019-08-08T12:00:00Z",
                    "interval": 2,
                    "frequency": "HOURLY"
                },
                "type": "FULL"
            }
        ],
        "sourceStageId": null,
        "id": "a21a22c-c377-59f3-9af9-3a0195ea33b0",
        "type": "PROTECTION",
        ... ...
    },
    {
        "createdAt": "2019-10-30T10:15:47.639Z",
        "operations": [
            {
                "schedule": null,
                "type": "FULL"
            }
        ],
        "sourceStageId": "a21a22c-c377-59f3-9af9-3a0195ea33b0",
        "id": "7d9b134d-e88e-884b-852e-4c08b6b7b5fd",
        "type": "REPLICATION",
        ... ...
    }
]
```

- 410 contains 411 (sourceStageId) and 412 (id)
- 420 contains 422 (schedule: null) and 421 (sourceStageId)

510
```
{
  "_index": "index_workflow",         — 511
  "_id": "8fcc0d6b-e8d2-45b9-842a-bd16f72bc4e4"
  ... ...
  "_source": {
    "name": "VM_Primary_Protection",
    "attributes": {
      ... ...
      "backupType": "FULL",
      "dependencies": null        — 512
    },
                                  — 513
    "stageId": "ea21a22c-c377-59f3-98f9-3a0495ea33bb",
    "operationType": "PROTECTION",
    ... ...
  }
}
```

520
```
{
  "_index": "index_workflow",
  "_id": "d0640394-594e-47f7-8e2d-dacd63613046",
  ... ...                          — 521
  "_source": {
    "name": "ManagedFileReplCopiesWorkflow",
    "attributes": {
      ... ...
      "backupType": "FULL",
      "dependencies": [            — 522
         "8fcc0d6b-e8d2-45b9-842a-bd16f72bc4e4"
      ]
    },
    "stageId": "7d9b134d-e88e-884b-852e-4c09b6b7b5fd",
    "operationType": "REPLICATION",
    ... ...                        — 523
  }
}
```

FIG. 5

DATA BACKUP METHOD, ELECTRONIC DEVICE AND COMPUTER PROGRAM PRODUCT

CROSS-REFERENCE TO RELATED APPLICATION

This patent application claims priority, under 35 U.S.C. § 119, of Chinese Patent Application No. 202010229730.4, filed Mar. 27, 2020, which is incorporated by reference in its entirety.

TECHNICAL FIELD

Embodiments of the present disclosure relate to the field of data storage, and more particularly relate to a data backup method, an electronic device and a computer program product.

BACKGROUND

Various storage systems and devices are increasingly used. In order to better protect data, some storage systems, such as a Data Domain (DD), support further replicating a copy of a data source to other destinations, such as other storage systems or public clouds. A user can configure whether the copy is further replicated to other destinations and to which destinations. In such a storage system, there will be at least two categories of workflows, i.e., generating the copy of the data source and further replicating the copy to other destinations. The coexistence of these two categories of workflows brings some problems to the operation of the storage system.

SUMMARY OF THE INVENTION

The embodiments of the present disclosure provide a data backup solution.

In a first aspect of the present disclosure, a data backup method is provided. The method includes creating a workflow related to a data source, the workflow being configured to generate a copy of the data source or to replicate the copy of the data source to a remote device. The method further includes identifying a dependency of the workflow, the dependency indicating whether the workflow depends on at least one additional workflow related to the data source. The method further includes scheduling the workflow based at least on the identified dependency.

In a second aspect of the present disclosure, an electronic device is provided. The electronic device includes a processor and a memory coupled to the processor. The memory storing an instruction, and the instruction, when executed by the processor, causes the device to execute an action. The action includes creating a workflow related to a data source, the workflow being configured to generate a copy of the data source or to replicate the copy of the data source to a remote device. The action further includes identifying a dependency of the workflow, the dependency indicating whether the workflow depends on at least one additional workflow related to the data source. The action further includes scheduling the workflow based at least on the identified dependency.

In a third aspect of the present disclosure, a computer program product is provided. The computer program product is tangibly stored on a computer-readable medium, and includes a machine-executable instruction. The machine-executable instruction, when executed, causes a machine to implement the method according to the first aspect.

The summary part is provided in order to introduce the selection of concepts in a simplified form, which will be further described in the detailed description below. The summary part is not intended to identify key features or essential features of the disclosure, nor is it intended to limit the scope of the disclosure.

BRIEF DESCRIPTION OF THE DRAWINGS

The above and other objectives, features and advantages of the present disclosure will become more apparent by describing example embodiments thereof in detail with reference to the accompanying drawings, and in the example embodiments of the present disclosure, the same reference numerals generally represent the same components. In the drawings:

FIG. 4 illustrates a schematic diagram of a configuration file according to some embodiments of the present disclosure;

FIG. 5 illustrates a schematic diagram of a workflow created according to some embodiments of the present disclosure;

DETAILED DESCRIPTION

The principle of the present disclosure will be described below with reference to a plurality of example embodiments illustrated in the accompanying drawings. Although the preferred embodiments of the present disclosure are shown in the accompanying drawings, it should be understood that these embodiments are only described to enable those skilled in the art to better understand and implement the present disclosure, and not to limit the scope of the present disclosure in any way.

The term "including" and variations thereof as used herein mean open-ended inclusion, that is, "including but not limited to." Unless specifically stated otherwise, the term "or" means "and/or." The term "based on" means "based at least in part on." The terms "one example embodiment" and "one embodiment" mean "at least one example embodiment." The term "another embodiment" means "at least one further embodiment." The terms "first," "second," etc. may refer to different or the same objects. Other explicit and implicit definitions may be included below.

Figure 1:
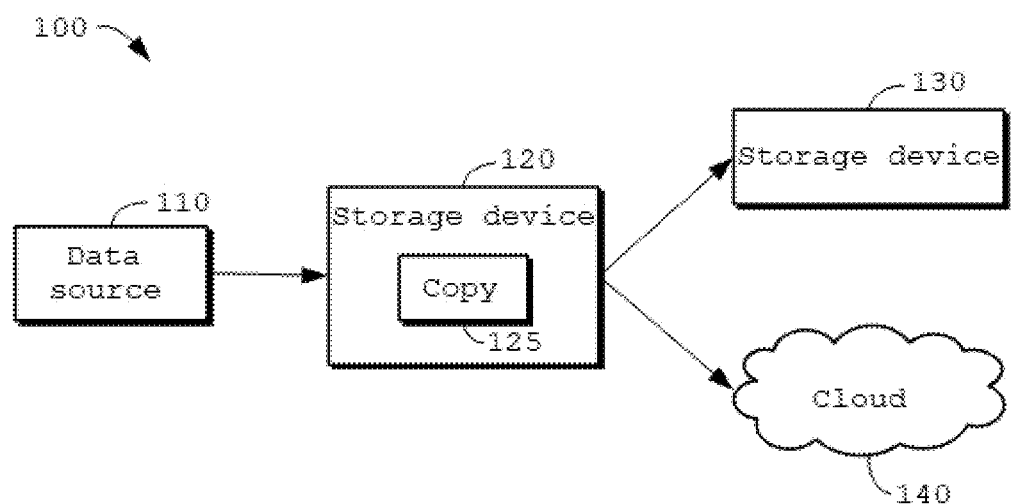
FIG. 1 illustrates a schematic diagram of an example environment in which the embodiment of the present disclosure may be implemented.

FIG. 1 illustrates a schematic diagram of example environment 100 in which the embodiment of the present disclosure may be implemented. In example environment 100, related data of protected data source 110 are replicated to storage system or storage device 120, thereby generating copy 125 at storage device 120. Such copy 125 may also be referred to as a primary copy or a primary protection copy. Although only one copy 125 is shown in FIG. 1, it should be understood that there may be a plurality of copies for data source 110 at storage device 120, and such copies may be full copies or incremental copies.

Data source 110 may be a virtual machine, a database, a file system, or the like, or may be associated with the virtual machine, the database, the file system, or the like. Although only one data source 110 is shown, it should be understood that storage device 120 may provide a data protection service for one or more data sources. In one example, storage device 120 may be located in a main data center.

In order to better protect the data of data source 110, copy 125 may be further replicated to other destinations, such as one or more of another storage device 130 and cloud 140 shown in FIG. 1. In other words, a secondary backup or storage for data source 110 is performed. Storage device 130 may be the same or a different type of storage device that is remote from storage device 120. In one example, storage device 130 may be located in other data centers different from the main data center. Cloud 140 may be any suitable private or public cloud. Here, "cloud" refers to an integrated computing platform that implements a cloud computing mode that allows a shared pool of computing resources to be accessed and used conveniently in an on-demand manner and an easily expanded manner. The cloud is sometimes referred to as a cloud platform or cloud-based system.

In example environment 100, there are three categories of operations or functions associated with copy 125. The generation or modification of copy 125 at storage device 120 may be referred to as primary backup, the replication or transmission of copy 125 to remote storage device 130 may be referred to as copy replication or simply referred to as replication, and the replication of copy 125 to cloud 140 may be referred to as cloud tier. The primary backup, the copy replication, and the cloud tier for copy 125 are not independent of each other. For example, the execution of the copy replication and the cloud tier depends on whether the primary backup is completed and whether the primary backup successfully generates copy 125.

Here, if workflow A depends on workflow B, workflow A may be referred to as a child workflow of workflow B, and workflow B may be referred to as a parent workflow of workflow A. It should be understood that the child workflow and the parent workflow are relative. In this case, a primary backup workflow for copy 125 may be considered as a parent workflow for a copy replication and cloud tier workflow for copy 125.

In a conventional storage system or storage device, the primary backup, replication, and cloud tier operations described above each have its own policy configuration and are scheduled in different workflows. In other words, in the conventional storage system or storage device, there is no implementation that coordinates these operations.

This conventional implementation may cause several issues. First, if the primary backup workflow is not completed (that is, the primary copy has not yet been generated or is being operated on) while the related replication or cloud tier workflow is started, the replication or cloud tier workflow will fail due to the lack of the primary copy. Another problem is that if the replication or cloud tier workflow is started too late, if the storage system of the primary copy fails catastrophically, some of the latest primary copies will be lost. Protected systems cannot be restored to the latest states. In addition, in order to achieve the replication or cloud tier of the primary copy, sophisticated algorithms need to be introduced to track and check which primary copies have been replicated to a secondary storage system. This will result in extra consumption of a storage space and an internal memory and reduction of the performance.

How to alleviate the above problems in the conventional solution is described below by taking the copy replication as an example. In order to solve the problem of the start time, a user needs to intentionally set the start time of the copy replication to be later than the end time of the primary backup. If the user fails to do so, the user will be prompted that no primary copy can be replicated.

Figure 2:
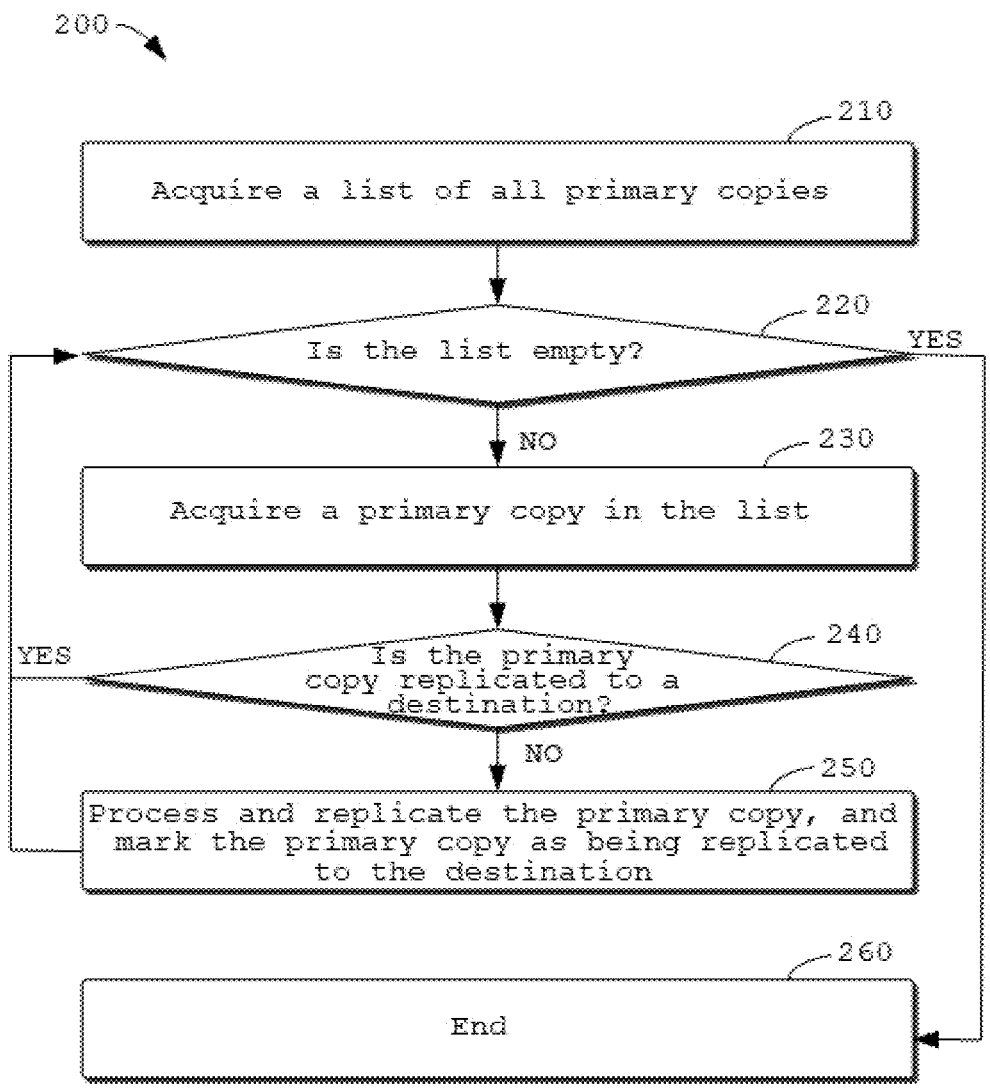
FIG. 2 illustrates a flow chart of a process of replicating a primary copy to other destinations.

In addition, for the copy replication operation, an additional tag needs to be introduced to mark whether the primary copy is replicated. For each replication schedule, all primary copies will be scanned and checked to determine those primary copies that need to be replicated. Referring to FIG. 2, a flow chart of process 200 of replicating a primary copy to a destination (e.g., a remote storage device) is shown.

At block 210, a list of all primary copies is obtained. All the primary copies here are for the same data source. At block 220, it is determined whether the list is empty. If the list is empty, process 200 proceeds to block 260, and ends at block 260. If the list is not empty, process 200 proceeds to block 230. At block 230, one primary copy in the list is obtained.

At block 240, it is determined whether the primary copy is replicated to the destination based on, for example, the set tag. If the primary copy has not been replicated to the destination, process 200 proceeds to block 250. At block 260, the primary copy is processed and replicated, and marked as being replicated to the destination. Process 200 thereafter returns to block 220. If, at block 240, it is determined that the copy has been replicated to the destination, process 200 returns to block 220 to perform the same process on other copies in the list.

The inventors of the present application recognize that there are several disadvantages to the conventional solution described above. First, this solution is not user-friendly. The user needs to specify values for a replication active window, such as start time and end time. If no primary copy has been already generated, the window specified by the user will be a no-op.

Second, this solution causes a waste of resources. The primary copy may be replicated to multiple storage destinations. For each of these destinations and for all primary copies, additional attributes need to be added to indicate whether the primary copies have been replicated to a certain destination, which causes a waste of storage space. In addition, a large number of primary copies need to be cached in a memory for search for those primary copies to be replicated (for example, process 200), which causes a waste of memory resources.

Moreover, even if most of the primary copies have been replicated, the entire primary copy list needs to be searched each time. This greatly reduces the performance of the storage system.

According to the embodiment of the present disclosure, a data backup solution is provided, so as to at least eliminate one or more of the above disadvantages. In an embodiment of the present disclosure, a storage system or storage device creates a workflow related to a data source. The workflow created may be configured to generate a copy of the data source or replicate it to other devices, such as another storage device or a cloud. When or after the workflow is created, the storage device may identify a dependency of the workflow. The dependency indicates whether the workflow depends on at least one of other workflows related to the data source. For example, the storage device may create a plurality of workflows related to the data source, such as a primary backup workflow, a copy replication workflow, and a cloud tier workflow, and identify dependencies among these workflows. The storage device then schedules the workflow based on the identified dependency.

Therefore, an embodiment of the present disclosure provides a dependency-based scheduling mechanism. With this mechanism, a child workflow that depends on a parent workflow may only be scheduled after the parent workflow is terminated, and may be scheduled directly after the parent workflow is terminated. In this way, workflows such as the copy replication or the cloud tier may be scheduled only on demand, and scanning of copies that have already been replicated is avoided. The storage system may improve the performance in the copy replication and the cloud tier and save the consumption of resources such as a storage and an internal memory, and the user does not need to specify a scheduling time of the child workflow, which can enhance the user experience.

Figure 3:
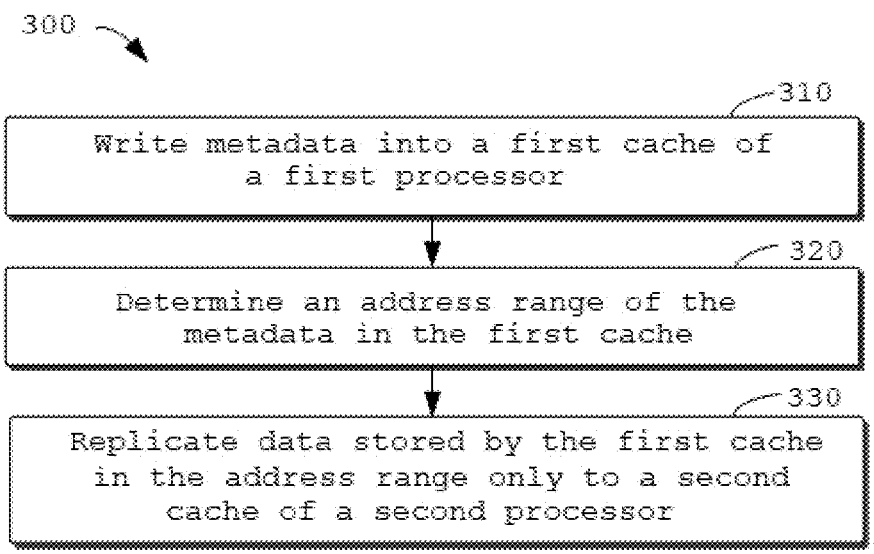
FIG. 3 illustrates a flow chart of a process of backing up data according to some embodiments of the present disclosure.

FIG. 3 illustrates a flow chart of process 300 of backing up data according to an embodiment of the present disclosure. Process 300 may be implemented at, for example, storage device 120. For ease of discussion, process 300 is described in conjunction with FIG. 1.

At block 310, storage device 120 creates a workflow related to data source 110. The created workflow may be configured to generate a copy of data source 110, such as copy 125, at storage device 120. Alternatively or additionally, the created workflow may be configured to replicate copy 125 of data source 110 to a remote device, for example, to at least one of storage device 130 or cloud 140. In other words, the created workflow may be one or more of the primary backup workflow, the copy replication workflow, and the cloud tier workflow described above.

In some embodiments, at block 310, storage device 120 may create a plurality of workflows related to data source 110. For example, the storage device 120 may create the primary backup workflow for generating copy 125, the copy replication workflow for replicating copy 125 to storage device 130, and the cloud tier workflow for copying copy 125 to cloud 140.

At block 320, storage device 120 identifies a dependency of the workflow. The dependency described herein may indicate whether the workflow depends on at least one additional workflow related to data source 110. The at least one additional workflow may be a workflow that has been created and scheduled (e.g., being executed), or a workflow that has been created but has not been scheduled.

As an example, if the copy replication workflow related to data source 110 is created at block 310, it may be identified that the copy replication workflow depends on the primary backup workflow related to data source 110. In some embodiments, the primary backup workflow may be created at block 310 along with the copy replication workflow.

In some embodiments, if storage device 120 creates a plurality of workflows at block 310, then at block 320, storage device 120 identifies dependencies among the plurality of workflows. For example, storage device 120 may identify the primary backup workflow related to data source 110 as not depending on any workflow, and identify the copy replication workflow and cloud tier workflow related to data source 110 as depending on the primary backup workflow related to data source 110. In other words, the primary backup workflow is a parent workflow of the copy replication workflow and the cloud tier workflow.

In some embodiments, an attribute (e.g., an attribute named "dependency") may be added to the created workflow to identify the dependency of the workflow. The value of this attribute may be NULL to indicate that the workflow does not depend on any other workflow. The value of this attribute may be an identifier ID of one or more parent workflows on which it depends, such as a universal unique identification code (UUID).

In some embodiments, storage device 120 may create workflows and identify dependencies based on a configuration file. Such a configuration file may also be referred to as a policy setting file. The configuration file may indicate an association between different workflows related to data source 110. For example, the configuration file may define a plurality of stages related to protection of data source 110, and each stage corresponds to a different type of workflows. The configuration file may further define associations between different stages. Storage device 120 may create a plurality of workflows corresponding to the plurality of stages defined by the configuration file, and identify dependencies of the plurality of created workflows based on the associations between the plurality of stages. For example, storage device 120 may associate the identifier of the parent workflow with a child workflow. In such an embodiment, the configuration file may be simply described to find out a stage with a parent stage but without a specified scheduling time, and then create related workflows and identify the dependencies based on the parent stage and child stages.

An example will be described below with reference to FIG. 4 and FIG. 5. FIG. 4 illustrates a schematic diagram of configuration file 400 according to some embodiments of the present disclosure. Example configuration file 400 defines two stages 410 and 420. In this example, a "TYPE" attribute has an attribute value of "PROTECTION" for stage 410 and an attribute value of "REPLICATION" for stage 420. Stage 410 may be configured to create a primary backup workflow, while stage 420 may be configured to create a copy replication workflow.

For stage 410, the attribute value of "sourceStageId" attribute 411 is null, which indicates that the workflow created based on stage 410 does not depend on any other workflow. The attribute value of "id" attribute 412 indicates an identifier of stage 410, which is a 32-byte UUID in this example. For stage 420, the attribute value of "sourceStageId" attribute 421 is the identifier of stage 410, which indicates that the workflow created based on stage 420 depends on the workflow created based on stage 410.

In addition, compared with stage 410, for stage 420, the attribute value of a "schedule" attribute is null, which indicates that it is not necessary to specify scheduling time for the workflow created based on stage 420. Storage device 120 may schedule the created workflow based on the identified dependency, as will be described below with reference to block 330. Therefore, in such an embodiment, the scheduling time of a child workflow may not be specified.

Referring to FIG. 5 now, schematic diagram 500 of a workflow created according to some embodiments of the present disclosure is illustrated. FIG. 5 illustrates workflow 510 created according to stage 410 and workflow 520 created according to stage 420. In this example, workflow 510 is configured to generate a copy of data source 110 at storage device 120 as a primary backup workflow. Workflow 520 is configured to replicate the copy of data source 110 to remote storage device 130 as a copy replication workflow.

The attribute values of "_id" attributes 511 and 521 are identifiers of corresponding workflows, which are 32-byte UUIDs in this example. "Dependencies" attributes 512 and 522 are configured to identify dependencies of the corresponding workflows, respectively. "StageId" attributes 513 and 523 are identifiers of the stages for creating the corresponding workflows, respectively.

Since "sourceStageId" attribute 411 of stage 410 is null, the attribute value of "dependencies" attribute 512 of workflow 510 is also null, which indicates that workflow 510 does not depend on other workflows. Meanwhile, since the attribute value of "sourceStageId" attribute 421 of stage 420 is the identifier of stage 410, the attribute value of "dependencies" attribute 522 of workflow 520 is the identifier of workflow 510, as shown in FIG. 5.

In this way, workflows 510 and 520 are created based on the configuration file, and the dependencies of workflows 510 and 520 are identified. In this example, workflow 520 may be considered as a child workflow of workflow 510. It should be understood that FIG. 5 is merely exemplary and not intended to be limiting. One workflow may depend on a plurality of parent workflows, and a plurality of workflows may also depend on the same workflow. In such an embodiment, the dependencies between different workflows may be automatically determined by using the associations defined in the configuration file without any user intervention.

Figure 6:
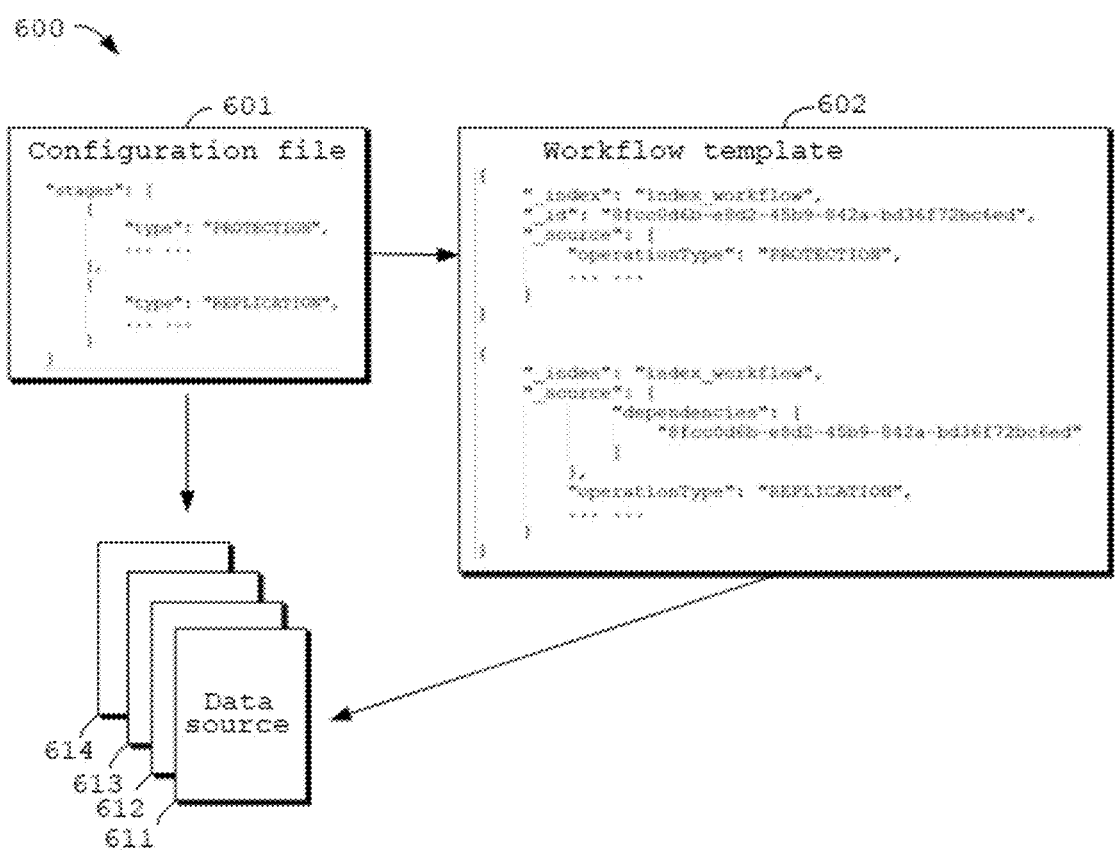
FIG. 6 illustrates a flow chart of a relationship among a data source, a configuration file, and a workflow according to some embodiments of the present disclosure.

Referring to FIG. 6 now, schematic diagram 600 of a relationship among a data source, a configuration file, and a workflow according to some embodiments of the present disclosure is illustrated. As mentioned above, storage device 120 may be configured to protect different types of assets or data sources, such as databases, virtual machines (VMs), and file systems. A data source to be protected will be allocated to or associated with a certain configuration file, and a workflow created based on the configuration file will be applied to the data source.

In the example of FIG. 6, data sources 611-614 are allocated to configuration file 601. In other words, data sources 611-614 will be protected based on a policy indicated by the configuration file. Storage device 120 may create workflow template 602, which includes two workflows, based on configuration file 601. Storage device 120 may apply workflow template 602 to all data sources 611-614 allocated to configuration file 601.

With continued reference to FIG. 3, at block 330, storage device 120 schedules the created workflow based at least on the identified dependency. If storage device 120 determines that the created workflow does not depend on other workflows, for example, if the attribute value of the "dependencies" attribute is null, the workflow may be executed. If start time is specified in the workflow, storage device 120 may execute the workflow according to the specified start time. For example, storage device 120 may directly schedule and execute workflow 510 for primary backup because workflow 510 does not depend on any other workflow.

If storage device 120 determines that the created workflow depends on a parent workflow, for example, if the attribute value of the "dependencies" attribute indicates identifiers of other workflows, storage device 120 may cause the workflow to be scheduled only when the parent workflow is terminated. For example, before workflow 510 is terminated, workflow 520 may not be scheduled.

In some embodiments, after a certain workflow is terminated, storage device 120 may determine a child workflow that depends on the workflow, and determine that the child workflow no longer depends on the workflow to allow the child workflow to be scheduled. For example, after the parent workflow is terminated, storage device 120 may remove the identifier of the parent workflow from the "dependencies" attribute of the child workflow. Referring to the example in FIG. 5, after primary backup workflow 510 is terminated, the identifier of primary backup workflow 510 will be removed from the "dependencies" attribute of copy replication workflow 520. Correspondingly, the "dependencies" attribute of copy replication workflow 520 will become null, so that copy replication workflow 520 may be scheduled.

Figure 7:
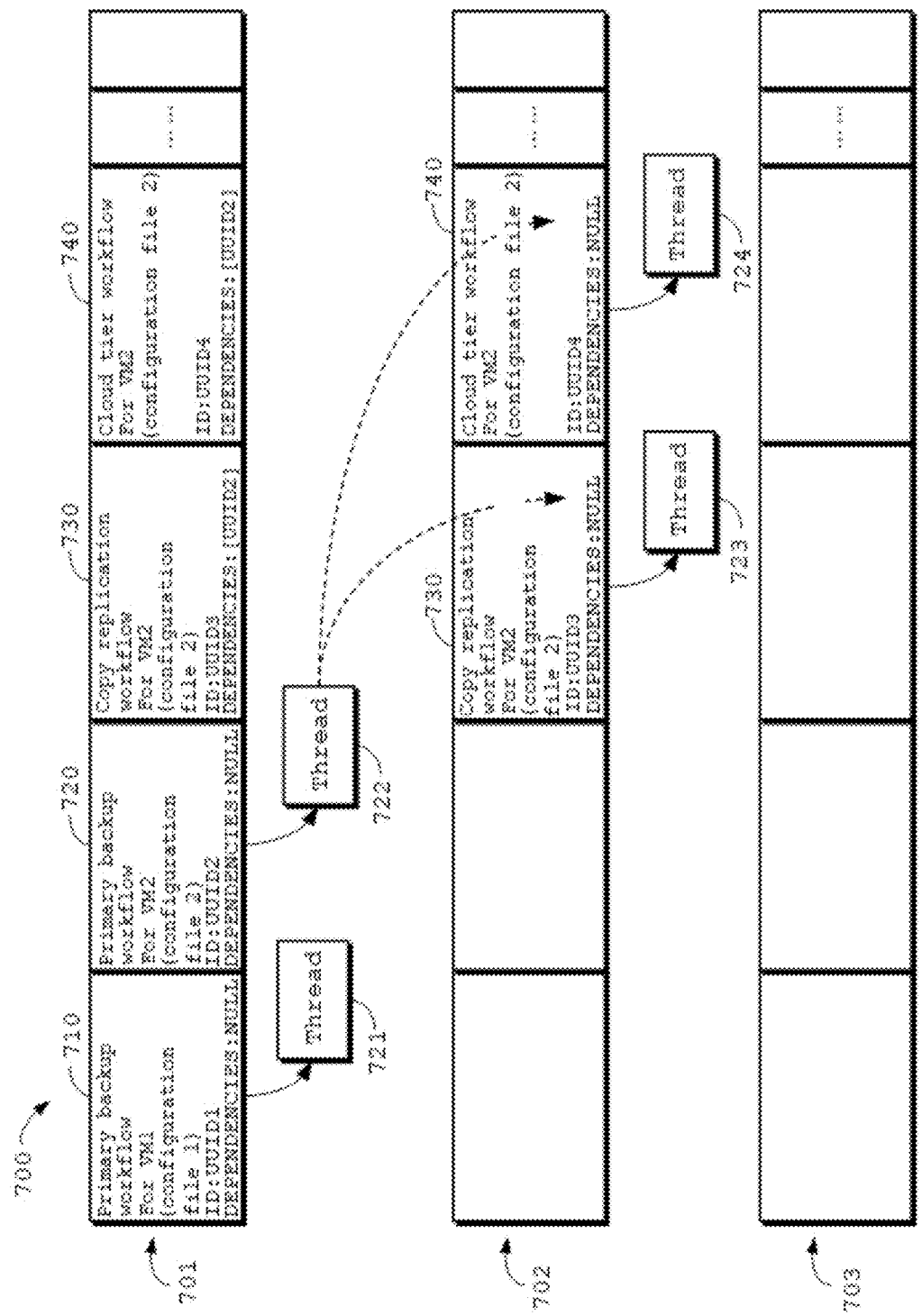
FIG. 7 illustrates a schematic diagram of scheduling of a workflow according to some embodiments of the present disclosure.

As mentioned above, there may be a plurality of associated workflows for the same data source, such as the primary backup workflow created based on the configuration file, the copy replication workflow, and the cloud tier workflow. At the same time, there are workflows related to different data sources. To this end, storage device 120 may manage the scheduling of these workflows by maintaining a queue to be scheduled. FIG. 7 illustrates schematic diagram 700 of scheduling of a workflow according to some embodiments of the present disclosure.

In the example of FIG. 7, at moment 701, a queue to be scheduled at least includes workflows 710, 720, 730, and 740. Workflow 710 is a VM1-related primary backup workflow created based on configuration file 1. The ID of workflow 710 is UUID1, and the "dependencies" attribute is null.

Workflows 720, 730, and 740 are all VM2-related workflows created based on configuration file 2. Workflow 720 is the primary backup workflow, workflow 730 is the copy replication workflow, and workflow 740 is the cloud tier workflow. Execution of workflows 730 and 740 involves a copy for VM2, which is generated by workflow 720, thereby depending on workflow 720. Correspondingly, the attribute values of the "dependencies" attribute of workflows 730 and 740 both include the ID of workflow 720, i.e., UUID2.

In this example, storage device 120 will first schedule workflows 710 and 720 because the two workflows do not depend on other workflows. For example, threads 721 and 722 may be used to execute workflows 710 and 720, respectively. After workflow 720 is terminated, storage device 120 may determine child workflows in the queue to be scheduled, which depend on workflow 720. In this example, the child workflows are workflows 730 and 740. Further, storage device 120 may identify that workflows 730 and 740 no longer depend on the workflow 720, so as to allow workflows 730 and 740 to be scheduled. For example, the ID of workflow 720 (i.e., UUID2) may be removed from the attribute values of the "dependencies" attributes of workflows 730 and 740.

At moment 702, workflows 730 and 740 are still in the queue to be scheduled, but the "dependencies" attributes have become null, which indicates that workflows 730 and 740 are allowed to be scheduled. Storage device 120 may schedule workflows 730 and 740. For example, threads 723 and 724 may be used to execute workflows 730 and 740, respectively. At moment 703, workflows 730 and 740 have also been terminated.

In some embodiments, after the parent workflow is terminated, storage device 120 may determine an operation result of the parent workflow on the copy, and further schedule the child workflows based on the operation result of the parent workflow on the copy. If the parent workflow successfully generates a copy, storage device 120 may execute corresponding one or more child workflows to replicate the copy to a remote device, such as remote storage device 130 or cloud 140. For example, if workflow 720 in FIG. 7 successfully generates a copy, storage device 120 may execute workflow 730 by using thread 723 to replicate the copy to storage device 130, and execute workflow 740 by using thread 724, so as to replicate the copy to cloud 140.

If the termination of the parent workflow is due to a replication failure or other errors, that is, if the parent workflow fails to generate a copy, the corresponding one or more child workflows will be canceled. For example, if workflow 720 in FIG. 7 fails to generate a copy, storage device 120 may schedule to cancel workflows 730 and 740.

Figure 8:
FIG. 8 illustrates a schematic diagram of tracking of a workflow according to some embodiments of the present disclosure.

In some embodiments, the workflows may be tracked to record information related to the execution of the workflows. For example, a job activity may be created for each workflow or each workflow having child workflows to record the status, information, and the like of a copy. FIG. 8 illustrates schematic diagram 800 of tracking of a workflow according to some embodiments of the present disclosure. In this example, workflow 510 that is a primary backup workflow is tracked by job activity 830. The "status" attribute in job activity 830 may be used to identify whether the copy is successfully generated. In this example, "OK" indicates that the copy is successfully generated. Attributes 832 and 833 may use the identifier of a protected data source (e.g., data source 110) to identify that workflow 510 is related to the data source. Attributes 834 and 835 may indicate the identifier of a copy generated by workflow 510, so that workflow 520 serving as a child workflow may obtain a copy to be operated by workflow 520.

After workflow 510 is terminated, storage device 120 may determine the attribute value of each attribute in job activity 830 based on the execution of workflow 510. If workflow 510 fails to successfully generate a copy, for example, if the "status" attribute indicates a failure or cancellation, workflow 520 may be canceled. If workflow 510 successfully generates a copy, the ID of the generated copy will be recorded in a "protectionCopyId" field. Workflow 520 will be executed, and only the copies indicated by the "protectionCopyId" field will be processed without scanning all copies.

The above describes that in some embodiments of the present disclosure, by identifying the dependencies of the workflow and scheduling the workflows based on the dependencies, the child workflows that depend on other workflows are only executed if there is a primary copy. In contrast, in a conventional solution, the periodically scheduled child workflows are likely to be terminated due to the lack of the primary copy. In this way, the user experience is enhanced.

Compared with the conventional solution, the embodiment according to the present disclosure can reduce the occupied storage space. In the conventional solution, the 32-byte UUID is used to record whether the copy has been replicated to other destinations, as described in the process with reference to FIG. 2. Referring to a common situation of storage systems, i.e., two locations and three centers, a copy is needed to be protected at 2 different locations, and each location has 3 different data centers. That is, in addition to the copy, 6 redundant copies are required. 4 types of data sources or assets need to be protected, such as virtual machines, file systems, database 1, and database 2. Each type of data source has 1000 protected data sources, and each data source has 1000 copies. Each copy requires the 32-byte UUID to record whether the copy is replicated to a destination. For this case, an additional storage space consumed is 6*4*32*1 k*1K=768M. In some embodiments according to the present disclosure, the copies are replicated to different destinations immediately after being generated, making it unnecessary to scan all the copies. Therefore, it is no longer necessary to record whether the copies are replicated to the destinations.

Compared with the conventional solution, the embodiments according to the present disclosure can use fewer memory resources. In the conventional solution, when searching to determine which copies need to be replicated to the destinations, all copies for all data sources of a specified type will be cached in a memory. It is supposed that each type of data source protected has 1000 protected data sources, each data source has 1000 primary copies, and each copy is averagely about 512 bytes in size. In this case, during searching for one type of data source, the memory resources that need to be consumed are 512*1 k*1K=512M. In contrast, in the embodiments according to the present disclosure, only the latest generated copies for the specified data source need to be processed. Therefore, only 512 bytes of memory resources are consumed.

In the conventional solution, in order to find out which copies need to be replicated to the destinations, all the copies for the specified type of data source need to be scanned and checked. The inventor of the present application found through tests that when a 2.5K virtual machine data source is replicated, it takes 4 s to replicate a new copy, but it takes 256 ms to scan 135 copies, so that it will take about 32 min to scan 1 million copies (1000 data sources, each of which includes 1000 copies), i.e., about 1 k*1 k/135*256 ms. In contrast, in the embodiment according to the present disclosure, only the latest generated copies for the specified data source need to be processed, so it only takes about 4 s to complete the replication of the 2.5K virtual machine data source. Therefore, the embodiments of the present disclosure improve the performance of the storage system.

In addition, the embodiments of the present disclosure may also improve the reliability of the storage system. The latest generated copies may be replicated to other destinations in time. In case of a failure in the main data center or an unexpected shutdown due to other problems, data may be restored to the latest status since the last backup.

Figure 9:
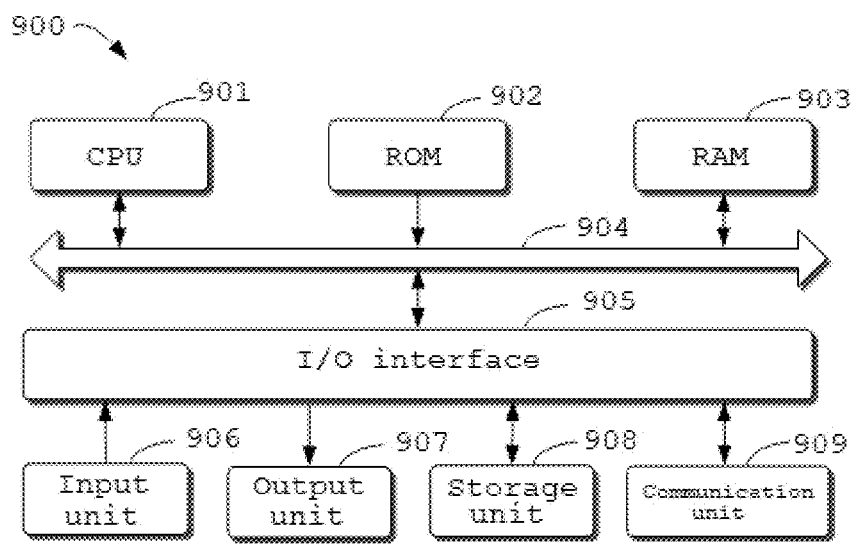
FIG. 9 illustrates a block diagram of an example device that may be configured to implement the embodiments of the present disclosure.

FIG. 9 illustrates a schematic block diagram of example device 900 that may be configured to implement the embodiments of the present disclosure. As shown in the figure, device 900 includes central processing unit (CPU) 901 that may perform various appropriate actions and processing according to a computer program instruction stored in read-only memory (ROM) 902 or a computer program instruction loaded from storage unit 908 into random access memory (RAM) 903. In RAM 903, various programs and data necessary for the operation of storage device 900 may also be stored. CPU 901, ROM 902, and RAM 903 are connected to each other through bus 904. Input/output (I/O) interface 905 is also connected to bus 904.

Various components in device 900 are connected to I/O interface 905, including: input unit 906, such as a keyboard and a mouse; output unit 907, such as various types of displays and speakers; storage unit 908, such as a magnetic disk and an optical disc; and communication unit 909, such as a network card, a modem, and a wireless communication transceiver. Communication unit 909 allows device 900 to exchange information/data with other devices through a computer network such as the Internet and/or various telecommunication networks.

Processing unit 901 performs the various methods and processes described above, such as process 300. For example, in some embodiments, process 300 may be implemented as a computer software program or computer program product, which is tangibly included in a machinereadable medium, such as storage unit 908. In some embodiments, part or all of the computer programs may be loaded and/or installed on device 900 via ROM 902 and/or communication unit 909. When the computer program is loaded to RAM 903 and executed by CPU 901, one or more steps of process 300 described above may be performed. Alternatively, in other embodiments, CPU 901 may be configured to perform process 300 in any other suitable manners (e.g., by means of firmware).

According to some embodiments of the present disclosure, a computer-readable medium is provided, on which a computer program is stored. The program, when executed by a process, implements the method according to the present disclosure.

Those skilled in the art should understand that the above steps of the method of the present disclosure may be implemented by a general-purpose computing apparatus, and they may be concentrated on a single computing apparatus or distributed on a network consisting of multiple computing apparatuses. Alternatively, they can be implemented with program code executable by the computing apparatus, so that they can be stored in a storage apparatus and executed by the computing apparatus, or they can be separately made into individual integrated circuit modules for implementation, or many modules or steps therein may be made into a single integrated circuit module for implementation. In this way, the present disclosure is not limited to any specific combination of hardware and software.

It should be understood that although several apparatuses or sub-apparatuses of the device are mentioned in the above detailed description, this division is merely exemplary and not mandatory. In fact, according to the embodiments of the present disclosure, the features and functions of the two or more apparatuses described above may be embodied in one apparatus. Conversely, the features and functions of one apparatus described above may be further divided and embodied by multiple apparatuses.

The above is only an optional embodiment of the present disclosure and is not intended to limit the present disclosure. For those skilled in the art, the present disclosure may have various modifications and changes. Any modification, equivalent replacement, improvement, etc. within the spirit and principle of the present disclosure shall fall within the protection scope of the present disclosure.

The invention claimed is:

1. A data backup method, comprising:
creating a workflow related to a data source, the workflow being configured to generate a copy of the data source or to replicate the copy of the data source to a remote device;
identifying a dependency of the workflow, the dependency indicating whether the workflow depends on at least one additional workflow related to the data source; and
scheduling the workflow based at least on the identified dependency.

2. The method according to claim 1, wherein scheduling the workflow comprises:
executing the workflow according to determining that the workflow does not depend on the additional workflow related to the data source.

3. The method according to claim 2, further comprising:
determining a child workflow depending on the workflow in response to termination of the workflow; and
determining that the child workflow no longer depends on the workflow to allow the child workflow to be scheduled.

4. The method according to claim 1, wherein scheduling the workflow comprises:
identifying the workflow as being allowed to be scheduled in response to termination of a parent workflow on which the workflow depends;
determining an operation result of the parent workflow on the copy according to determining that the workflow is allowed to be scheduled; and
scheduling the workflow further based on the operation result.

5. The method according to claim 4, wherein scheduling the workflow further based on the operation result comprises:
executing the workflow according to determining that the parent workflow successfully generates the copy, so as to replicate the copy to the remote device; and
canceling the workflow according to determining that the parent workflow fails to generate the copy.

6. The method according to claim 1, wherein identifying the dependency of the workflow comprises:
acquiring a configuration file for the data source, the configuration file indicating an association between different workflows related to the data source;
determining whether the workflow depends on the at least one additional workflow based on the configuration file; and
associating an identifier of the at least one additional workflow with the workflow according to determining that the workflow depends on the at least one additional workflow.

7. The method according to claim 1, wherein the data source comprises at least one of the following: a virtual machine, a database, or a file system.

8. An electronic device, comprising:
a processor; and
a memory coupled to the processor, the memory storing an instruction, wherein the instruction, when executed by the processor, causes the device to execute an action, wherein the action comprises:
creating a workflow related to a data source, the workflow being configured to generate a copy of the data source or to replicate the copy of the data source to a remote device;
identifying a dependency of the workflow, the dependency indicating whether the workflow depends on at least one additional workflow related to the data source; and
scheduling the workflow based at least on the identified dependency.

9. The device according to claim 8, wherein scheduling the workflow comprises:
executing the workflow according to determining that the workflow does not depend on the additional workflow related to the data source.

10. The device according to claim 9, wherein the action further comprises:
determining a child workflow depending on the workflow in response to termination of the workflow; and
determining that the child workflow no longer depends on the workflow to allow the child workflow to be scheduled.

11. The device according to claim 8, wherein scheduling the workflow comprises:
identifying the workflow as being allowed to be scheduled in response to termination of a parent workflow on which the workflow depends;

determining an operation result of the parent workflow on the copy according to determining that the workflow is allowed to be scheduled; and scheduling the workflow further based on the operation result.

12. The device according to claim 11, wherein scheduling the workflow further based on the operation result comprises:

executing the workflow according to determining that the parent workflow successfully generates the copy, so as to replicate the copy to the remote device; and canceling the workflow according to determining that the parent workflow fails to generate the copy.

13. The device according to claim 8, wherein identifying the dependency of the workflow comprises:

acquiring a configuration file for the data source, the configuration file indicating an association between different workflows related to the data source;

determining whether the workflow depends on the at least one additional workflow based on the configuration file; and associating an identifier of the at least one additional workflow with the workflow according to determining that the workflow depends on the at least one additional workflow.

14. The device according to claim 8, wherein the data source comprises at least one of the following: a virtual machine, a database, or a file system.

15. A non-transitory computer-readable medium on which a computer program comprising a machine-executable instruction is tangibly stored thereon, which when executed by a processor, causes the processor to perform an action, the action comprising:

creating a workflow related to a data source, the workflow being configured to generate a copy of the data source or to replicate the copy of the data source to a remote device;

identifying a dependency of the workflow, the dependency indicating whether the workflow depends on at least one additional workflow related to the data source; and scheduling the workflow based at least on the identified dependency.

16. The non-transitory computer-readable medium according to claim 15, wherein scheduling the workflow comprises:

executing the workflow according to determining that the workflow does not depend on the additional workflow related to the data source.

17. The non-transitory computer-readable medium according to claim 16, wherein the action further comprises:

determining a child workflow depending on the workflow in response to termination of the workflow; and determining that the child workflow no longer depends on the workflow to allow the child workflow to be scheduled.

18. The non-transitory computer-readable medium according to claim 15, wherein scheduling the workflow comprises:

identifying the workflow as being allowed to be scheduled in response to termination of a parent workflow on which the workflow depends;

determining an operation result of the parent workflow on the copy according to determining that the workflow is allowed to be scheduled; and scheduling the workflow further based on the operation result.

19. The non-transitory computer-readable medium according to claim 18, wherein scheduling the workflow further based on the operation result comprises:

executing the workflow according to determining that the parent workflow successfully generates the copy, so as to replicate the copy to the remote device; and canceling the workflow according to determining that the parent workflow fails to generate the copy.

20. The non-transitory computer-readable medium according to claim 15, wherein identifying the dependency of the workflow comprises:

acquiring a configuration file for the data source, the configuration file indicating an association between different workflows related to the data source;

determining whether the workflow depends on the at least one additional workflow based on the configuration file; and associating an identifier of the at least one additional workflow with the workflow according to determining that the workflow depends on the at least one additional workflow.

* * * * *